United States Patent

[11] 3,617,105

[72] Inventor Alex Konrad
Ridgefield, N.J.
[21] Appl. No. 69,020
[22] Filed Sept. 2, 1970
[45] Patented Nov. 2, 1971
[73] Assignee Tech Laboratories, Inc.
Palisades Park, N.J.

[54] MICROGRAPHIC PROJECTION SYSTEM
3 Claims, 3 Drawing Figs.

[52] U.S. Cl. .................................................. 350/6,
95/4.5, 178/7.6, 250/219 FR, 250/235, 350/285,
353/27
[51] Int. Cl. ................................................ G02b 27/18
[50] Field of Search .......................................... 353/25, 26,
27, 48, 51, 82, 98, 99; 350/6, 7, 285; 178/7.6;
250/215, 219 FR, 234, 235, 236; 95/4.5

[56] References Cited
UNITED STATES PATENTS
1,901,013   3/1933   Uher, Jr. ........................ 95/4.5
3,359,507   12/1967  Hall .............................. 331/94.5

FOREIGN PATENTS
1,347,044   11/1963  France ..........................

*Primary Examiner*—David Schonberg
*Assistant Examiner*—John W. Leonard
*Attorney*—Magnus Bjorndal ABSTRACT: A system for projecting images from microfilm of various widths, making it possible to have two or more, or as many as 10 to 12, or even more, pictures in parallel on a strip of film. The image is then selected by electronic means whereby the location of the same will be on a coordinate electronic system that can be selected by a simple keyboard and arranged so that both the longitudinal and the transverse motions are carried on at the same time, thereby reducing the time required. The system consists of two movable scanning mirrors and a multiple set of fixed mirrors which may be lined up with the scanning mirrors, two for each of the number of pictures in transverse on the film. The scanning mirrors are automatically, and by electronic means, through appropriate coding, set for the picture desired on the transverse position, while the longitudinal picture is simultaneously selected by another set of appropriate or suitable coding.

PATENTED NOV 2 1971

INVENTOR
ALEX KONRAD

BY Magnus Bjorndal
ATTORNEY

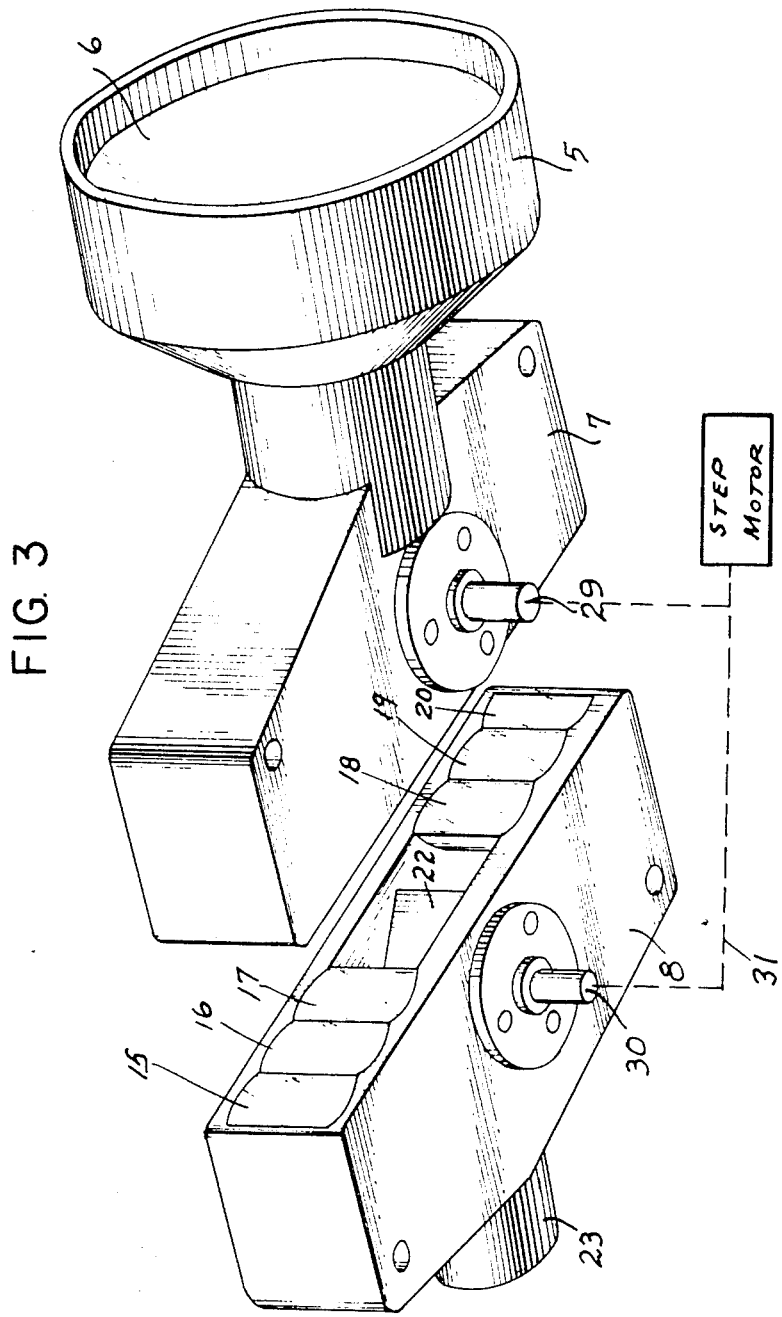

MICROGRAPHIC PROJECTION SYSTEM

CROSS REFERENCE TO RELATED APPLICATION

This application is related to copending application Ser. No. 697,555, now Pat. No. 3,564,209, filed Dec. 27, 1967, entitled "Data Storage and Quick Retrieval Unit."

The present invention is particularly useful in the filing, storage and selection of large numbers of pages of information, drawings, photographs, and the like. In many instances, there are applications where a large number of drawings, pictures, or written information may be stored for quick reference. With the system of the present invention, it is thus possible to store upward of 100,000 drawings or the like, and to pick any one of these in a very short time, such as within a few seconds.

A primary object of the present invention is to provide an automatic electronic system for storing and retrieving a large number of items of information.

A further important object of the present invention is to provide a system which will project a multiplicity of images with one set of lenses, and at the same time maintain a constant focal distance for various distances of the objects from the condensing and projection lenses without having to move either one of the same.

A still further object of the invention is to provide such a system and wherein the time for retrieving is as short as possible.

Still another object of the invention is to provide an optical system with one variable whereby a large number of different viewing angles may be automatically attained.

Still another object of the invention is to provide a system for projecting an image of a stationary microfilm frame on a stationary screen from a row of fixed microfilm frames without moving the condensing or projecting lens system.

Other objects and advantages of the invention will become apparent during the course of the following description:

In the accompanying drawings, forming a part of this specification and in which like numerals are used to designate like parts throughout the same:

FIG. 3 illustrates an outside perspective view of the assembled optics.

Figure 1:
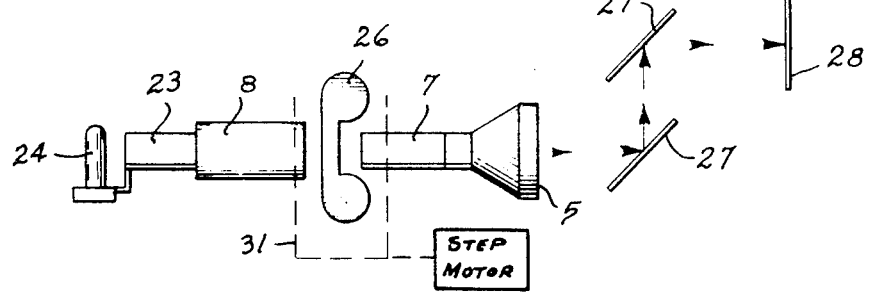
FIG. 1 is a schematic side elevational view of the system.

Referring in detail to the drawings, wherein there is illustrated a preferred embodiment of the invention, the numeral 5 indicates a tubular housing in which the projection lens 6 is mounted, and this is of the quick-change type to facilitate a change of lens if necessary or desired. Housings 7 and 8 on the assemblies of the fixed mirrors 9, 10, 11, 12, 13, and 14, and the condenser lenses 15, 16, and 17 on one side and a similar number of condenser lenses 18, 19 and 20 and associated fixed mirrors are on the other side of the center line, as shown in the drawings.

The housings 7 and 8 also contain the two movable mirrors 21 and 22. At the rear of housing 8 is a tubular extension 23 which contains the primary condensing lens, and in the rear of that is mounted the projection lamp 24, FIGS. 1 and 2. In the drawings is shown how the film 25 contained in the film magazine 26 is arranged or positioned. The film 25 may be up to 105 mm., or more, depending upon how many items are to be stored.

The mirrors 27 are used when necessary to bring the image to a desired position on the screen 28.

It is to be noted that the projection lens is adapted to be provided with a suitable focusing means or mechanism for properly focusing the image on the screen.

One of the most important features of the present invention resides in the provision of the synchronized rotating scanning mirrors which are suitably tied together as by means of a nonslipping belt or chain which connects the two shafts 29 and 30. In addition, these mirrors can be quickly and automatically adjusted in corresponding increments so that, for example, the light beam coming from the primary condensing lens 23 will hit on mirror 22, reflect to mirror 14, go through the secondary condensing lens 15, through the film 25 to the fixed mirror 11, and is reflected on the second rotatable mirror 21. This rotatable mirror 21 reflects the light beam through the retrofocus projecting lens 6. It must be noted that the shafts 29 and 30 are connected by a nonslipping belt or chain such as, for example, a timing chain, and this assembly has a standard solenoid or step motor drive for driving it in the proper increments.

In order to avoid confusion in the illustration the belt is not shown but indicated in dotted lines by the numeral 31 in FIG. 1.

The following is given as a detailed description of the operation of the present invention:

The film is contained in the magazine 26 which is held in the machine in a vertical position such as shown in FIG. 1. The film may be as mentioned above of many different widths, depending on the number of images to be stored. In addition to the images, the film also carried a code for the location of each image, which is done by automatic electronic means. The film shown in FIG. 2 may be 105 mm. wide, one having six rows of images with additional space for coding. By utilizing a different magnification, one may use as many as 10 or 12 rows of images on one film. It will be obvious that one can have as little as three or four images and use a 35 mm. film, or 16 mm. film with one image or the like.

As previously described, the light beam comes from the projection lamp 24, goes through the primary condensing lenses, hits the mirror 22, which has been placed in a certain position by the automatic electronic means, whereupon the light beam is reflected to the desired transverse fixed mirror, through the secondary condenser lens, through the selected image frame, on to the second fixed mirror, to the second rotatable mirror and finally through the retrofocus projecting lens on to the screen. It will be obvious that to give good results the fixed mirrors 9 to 14 have to be placed on such a curve that the optical path distance from the rotatable mirror 22 to any one of the fixed mirrors and back to the second rotatable mirror 21 always has to be the same. This feature is new and very essential in the present invention in order to give a stable projection without refocusing and at the shortest possible time.

As shown in the drawings, the numeral 24 indicates the projection lamp while the numeral 23 indicates the extension in which is mounted the primary condensing lens, and the numeral 8 indicates the housing having the fixed and scanning mirrors therein with the secondary condensing lens. The numeral 26 indicates the film magazine, and the numeral 7 indicates the fixed and scanning mirror housing, while the numeral 28 indicates the screen.

Figure 2:
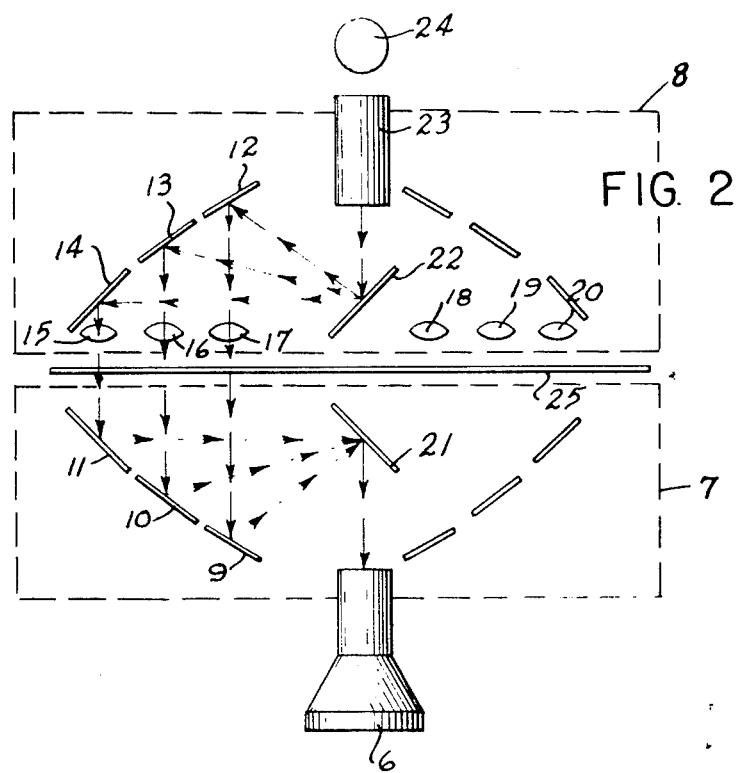
FIG. 2 is a top plan view of the system showing the optics more in detail.

FIG. 2 illustrates the fixed deflection mirrors, the primary condensing lens housing or extension 23, the projection lamp 24, the synchronized rotating scanning mirrors, the secondary condensing lens arrangement, and the retrofocus projection lens 6.

In FIG. 3 there is illustrated an outside perspective view of the assembled optics, including the tubular extension 23 that contains the primary condensing lens, the scanning mirrors, the input shafts 29 and 30 that extend outwardly from their mountings or fittings slightly, and the retrofocus lens which may be provided with a suitable connection for mounting the same.

It is to be understood that the form of the invention, herewith shown and described, is to be taken as a preferred example of the same, and that various changes in the shape, size and arrangement of the parts may be resorted to without departing from the spirit of the invention or the scope of the subjoined claims.

What is claimed is:

1. A micrographic projection system for selectively projecting one of several portions of a film, comprising a housing having a film-receiving opening, a pair of synchronized, rotatable scanning mirrors located in the housing on either side of the film-receiving opening, a plurality of fixed mirror pairs symmetrically disposed along the film-receiving opening at different distances from the scanning mirrors, said fixed mirror pairs being positioned along a curve so that a constant optical path length is provided from one scanning mirror to the other by way of any selected fixed mirror pair.

2. A micrographic projection system as defined in claim 1 wherein said rotatable scanning mirrors are operated by a common step motor with a nonslipping belt interlocking the two together.

3. A micrographic projection system as defined in claim 1 wherein said rotatable scanning mirrors are geared together and driven by a step motor.

* * * * *